United States Patent
Dasari et al.

(10) Patent No.: US 10,986,203 B2
(45) Date of Patent: Apr. 20, 2021

(54) BALANCING AND CONTROL FRAMEWORK FOR REAL-TIME PROCESSING

(71) Applicant: American Express Travel Related Services Company, Inc., New York, NY (US)

(72) Inventors: Srinivas Dasari, Scottsdale, AZ (US); Mohamed Faisal Mohamed Farook, Phoenix, AZ (US); Bala Sandeep Kandi, Phoenix, AZ (US); Venkataselvam Muthusamy, Phoenix, AZ (US); Amit Poddar, New York, NY (US); Michael D. Wirsig, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 79 days.

(21) Appl. No.: 16/270,942

(22) Filed: Feb. 8, 2019

(65) Prior Publication Data

US 2020/0259914 A1  Aug. 13, 2020

(51) Int. Cl.
*H04L 29/08* (2006.01)
*G06F 9/54* (2006.01)
*G06F 16/901* (2019.01)
*G06F 16/908* (2019.01)
*H04L 12/58* (2006.01)

(52) U.S. Cl.
CPC .......... *H04L 67/2833* (2013.01); *G06F 9/542* (2013.01); *G06F 9/546* (2013.01); *G06F 16/901* (2019.01); *G06F 16/908* (2019.01); *H04L 51/046* (2013.01); *H04L 67/1004* (2013.01)

(58) Field of Classification Search
CPC ............... H04L 67/2833; H04L 51/046; H04L 67/1004; G06F 16/901; G06F 16/908; G06F 9/542; G06F 9/546
USPC ......................................................... 709/223
See application file for complete search history.

(56) References Cited

U.S. PATENT DOCUMENTS

| 2006/0106840 | A1* | 5/2006 | Rooney | H04L 67/26 |
| 2018/0025181 | A1* | 1/2018 | Barinov | G06F 21/645 |
| | | | | 726/26 |
| 2019/0281100 | A1* | 9/2019 | Lo | H04N 21/45457 |

* cited by examiner

*Primary Examiner* — Moustafa M Meky
*Assistant Examiner* — Sahera Halim
(74) *Attorney, Agent, or Firm* — Thomas Horstemeyer, LLP

(57) ABSTRACT

Systems and methods for messaging balancing and control are disclosed. The system may retrieve aggregated message events from a first time window based on a balancing schedule. Each message event in the aggregated message events may include a timestamp. The timestamp may be within a time period assigned to the first time window. The system may execute an aggregated balancing operation on the aggregated message events. In response to determining in the aggregated balancing operation that the aggregated message events are out-of-balance, the system may execute an event balancing operation on the message events.

20 Claims, 4 Drawing Sheets

9:00 – 9:15

435

| PROCESSING SYSTEM | MESSAGE ID | TIMESTAMP | MESSAGE EVENT ID | MESSAGE DATA 1 | MESSAGE DATA 2 |
|---|---|---|---|---|---|
| SYSTEM 25-1 | 1001 | 9:03:02 | IMC_PREPAYMENT | SUBMISSION_AMT: 1307.30 | TOTAL_AMT: 181.31 |
| SYSTEM 25-1 | 1002 | 9:07:18 | EXE_SALESCOUNT | SALESRECEIVED_AMT: 20 | SALESSENT_AMT: 18 |
| SYSTEM 25-2 | 1003 | 9:03:02 | IMC_PREPAYMENT | SUBMISSION_AMT: 1207.20 | TOTAL_AMT: 80.32 |
| SYSTEM 25-3 | 1004 | 9:07:18 | EXE_SALESCOUNT | SALESRECEIVED_AMT: 20 | SALESSENT_AMT: 18 |
| SYSTEM 25-2 | 1005 | 9:03:02 | IMC_PREPAYMENT | SUBMISSION_AMT: 100.10 | TOTAL_AMT: 100.99 |
| . . . | . . . | . . . | . . . | . . . | . . . |

FIG. 4

BALANCING AND CONTROL FRAMEWORK FOR REAL-TIME PROCESSING

FIELD

This disclosure generally relates to balancing and control systems, and more specifically, to systems and methods for balancing and control using time interval windows to process messages in real-time.

BACKGROUND

Data transfer policies often include an audit of passed data transfers to determine that the data transfers were accurate. Balancing and Control (B&C) is the process to ensure data transfer between systems is accurate, complete and on-time. In typical batch processing, data is transferred from system to system in the same sequence and at the same time. Thus, all the data is received at the first system in one batch and is transmitted to the second system in one batch, in response to all of the data completing processing in the first system. For example, a data transfer with B&C monitoring processes in place typically involves a sending system and a receiving system both in communication with a third party intermediary system. The sending system transmits the data to the receiving system, and the sending system and receiving system send a trigger containing B&C information to the third party. The third party then uses that information to perform balancing and control to validate the data transfers.

In real-time processing, different systems and platforms may process the data at different speeds and/or in different sequences. A technical problem is that, as the data is transferred and processed in real-time, it may be difficult to determine the time and sequence that each data packet arrives at and leaves from each system, thus increasing the time and processing power needed to validate data transfers and complete B&C processes. Typical B&C processes may be further complicated as duplicate data events are received in the system, causing the system to reduplicate balancing efforts.

SUMMARY

Systems, methods, and articles of manufacture (collectively, the "system") for balancing and control are disclosed. The system may retrieve aggregated message events from a first time window based on a balancing schedule, wherein each message event in the aggregated message events comprises a timestamp, and wherein the timestamp is within a time period assigned to the first time window. The system may execute an aggregated balancing operation on the aggregated message events. The system may execute an event balancing operation on the message events in the aggregated message events, in response to determining in the aggregated balancing operation that the aggregated message events are out-of-balance.

In various embodiments, each message event may comprise metadata associated with a message, and each message event may be generated by a processing system configured to process the message. The step of executing the aggregated balancing operation may comprise comparing message data from the message events for each processing system. The step of executing the event balancing operation may comprise comparing each message event from the aggregated message events to determine the processing system causing the out-of-balance. The processing system may generate each message event in response to receiving the message or completing processing of the message.

In various embodiments, the system may receive a first message event from the processing system. The system may store the first message event in a message queue. The system may retrieve the first message event from the message queue, wherein the first message event is retrieved based on a microbatch time period. The system may store the first message event in the first time window, wherein the first time window is selected to store the first message event based on the timestamp. The system may generate an out-of-balance alert in response to determining that the aggregated message events are out-of-balance. In various embodiments, the system may retrieve second aggregated message events from a second time window based on the balancing schedule, wherein each message event in the second aggregated message events comprises a second timestamp, wherein the second timestamp is within a second time period assigned to the second time window, and wherein the second time period is different from the time period assigned to the first time window. The system may execute the aggregated balancing operation on the second aggregated message events.

In various embodiments, the system may retrieve first aggregated message events from a first time window based on a balancing schedule, wherein each message event in the first aggregated message events comprises a first timestamp, and wherein the first timestamp is within a first time period assigned to the first time window. The system may execute an aggregated balancing operation on the first aggregated message events to determine whether the first aggregated message events are in-balance. The system may retrieve second aggregated message events from a second time window based on the balancing schedule, wherein each message event in the second aggregated message events comprises a second timestamp, wherein the second timestamp is within a second time period assigned to the second time window, and wherein the second time period is different from the first time period. The system may execute the aggregated balancing operation on the second aggregated message events to determine whether the second aggregated message events are in-balance.

In various embodiments, in response to determining that the first aggregated message events are out-of-balance, the system may execute an event balancing operation on the message events in the first aggregated message events. In response to determining that the second aggregated message events are out-of-balance, the system may execute the event balancing operation on the message events in the second aggregated message events. Each message event may comprise metadata associated with a message, and wherein each message event is generated by a processing system configured to process the message. The steps of executing the aggregated balancing operation may comprise comparing message data from the message events for each processing system.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 4 illustrates an exemplary time window for use in a system for balancing and control of message, in accordance with various embodiments.

DETAILED DESCRIPTION

Systems for balancing and control are disclosed. The system may perform balancing and control operations to validate the transfer of messages being processed in real-time. The system may validate not only that the message is correctly received, processed, and/or transmitted from each processing system (and/or end-to-end), but also that message content is not lost or duplicated and/or that message content is correctly processed at each processing system. As discussed further herein, in response to determining an out-of-balance message event, the system may generate an alert so that corrective action can be taken.

As discussed herein, a "message" may comprise any type of data being transmitted in a data processing system wherein balancing and control validations are desired. For example, a message may comprise a data message, a file, a data packet, an API request, an API response, and/or the like.

In various embodiments, in an exemplary practical application, the message may comprise financial transaction data received from a merchant or third-party. The transaction data may be processed by one or more financial processing systems (e.g., account holder systems, authorization systems, authentication systems, settlement systems, accounts receivable system, account payable systems, loyalty point systems, a transaction account issuer's Credit Authorization System ("CAS"), etc.) in real-time. In contrast to financial systems implementing typical balancing and control procedures, the system may decrease processing time needed to validate the transaction data as processed in real-time, thus enabling merchants to receive payment faster, transactions to be reconciled within the same calendar day, transactions to be posted for user review faster, and loyalty points to accrue faster.

The system may therefore provide a technical solution to the technical problem presented by typical balancing and control processes in real-time processing systems. For example, by validating messages using the balancing and control processes discussed herein, the system may decrease the amount of time needed to validate the messages thus decreasing the processing power and computing resources typically needed to perform balancing and control validations. Typically, in various embodiments, in a well-tuned system an out-of-balance event may occur rarely due to software bugs or hardware failures. Thus, the present system may delay the typical expensive and processing intensive stage of reprocessing message events until an out-of-balance event is detected, as discussed further herein.

Figure 1:
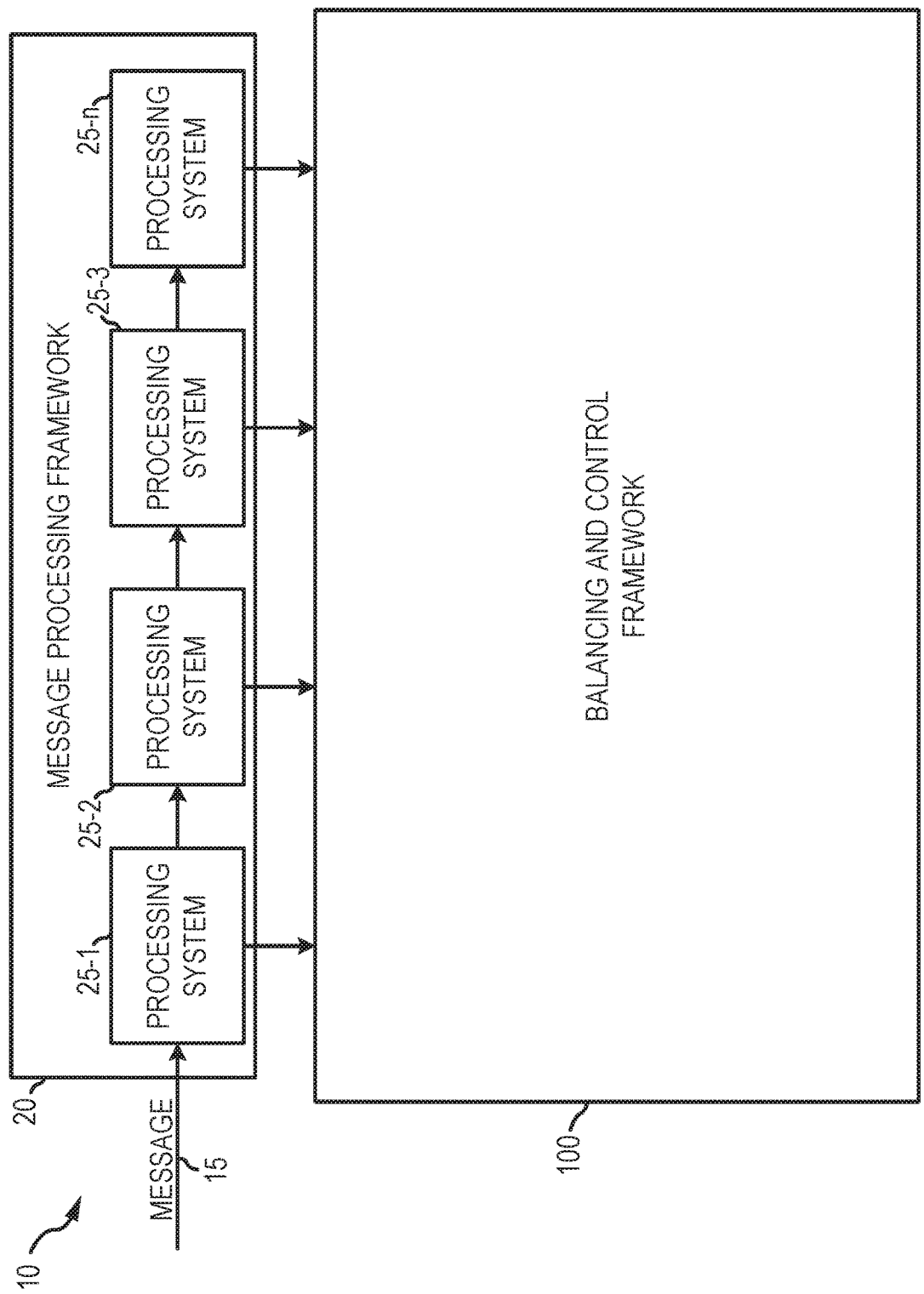
FIG. 1 is a block diagram illustrating a system for balancing and control of messages, in accordance with various embodiments.

In various embodiments, and with reference to FIG. 1, a system 10 for balancing and control of messages is disclosed. System 10 may comprise one or more of a message processing framework 20 and/or a balancing and control framework 100. System 10 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

In various embodiments, message processing framework 20 may be configured to receive and process one or more messages 15. Message processing framework 20 may be in electronic communication with balancing and control framework 100. Message processing framework 20 may comprise one or more processing systems. For example, and in accordance with various embodiments, message processing framework 20 may comprise a first processing system 25-1, a second processing system 25-2, a third processing system 25-3, an "Nth" processing system 25-n, and/or any other number of processing systems. Each processing system 25 may comprise one or more hardware, software, and/or database components. For example, each processing system 25 may comprise one or more network environments, servers, computer-based systems, processors, databases, and/or the like. One or more processing systems 25 may comprise at least one computing device in the form of a computer or processor, or a set of computers/processors, although other types of computing units or systems may be used such as, for example, a server, web server, pooled servers, or the like. One or more processing systems 25 may also include software, such as services, APIs, SDKs, and the like, configured to perform various data processing operations. Each processing system 25 may comprise any suitable application, system, or the like capable of processing message 15. In accordance with one exemplary embodiment, message processing framework 20 may comprise a financial processing system. For example, first processing system 25-1 may comprise an authorization system, second processing system 25-2 may comprise an accounts receivable system, third processing system 25-3 may comprise an account payable system, Nth processing system 25-n may comprise a loyalty point system, and/or the like.

Each message 15 may comprise a timestamp. The timestamp may comprise the time and/or date that the message 15 is received in system 10. For example, in response to receiving a message 15 in system 10, message processing framework 20 may timestamp message 15 based on a current time in system 10. The timestamp may be associated with message 15 via metadata, a tag, a note, or the like. In various embodiments, each message may also comprise a message identifier (e.g., a message name, a file name, a message ID, etc.), a message flow type (e.g., the order of processing systems 25 that the message 15 is to be processed in), message data, a message version, and/or the like.

Figure 2:
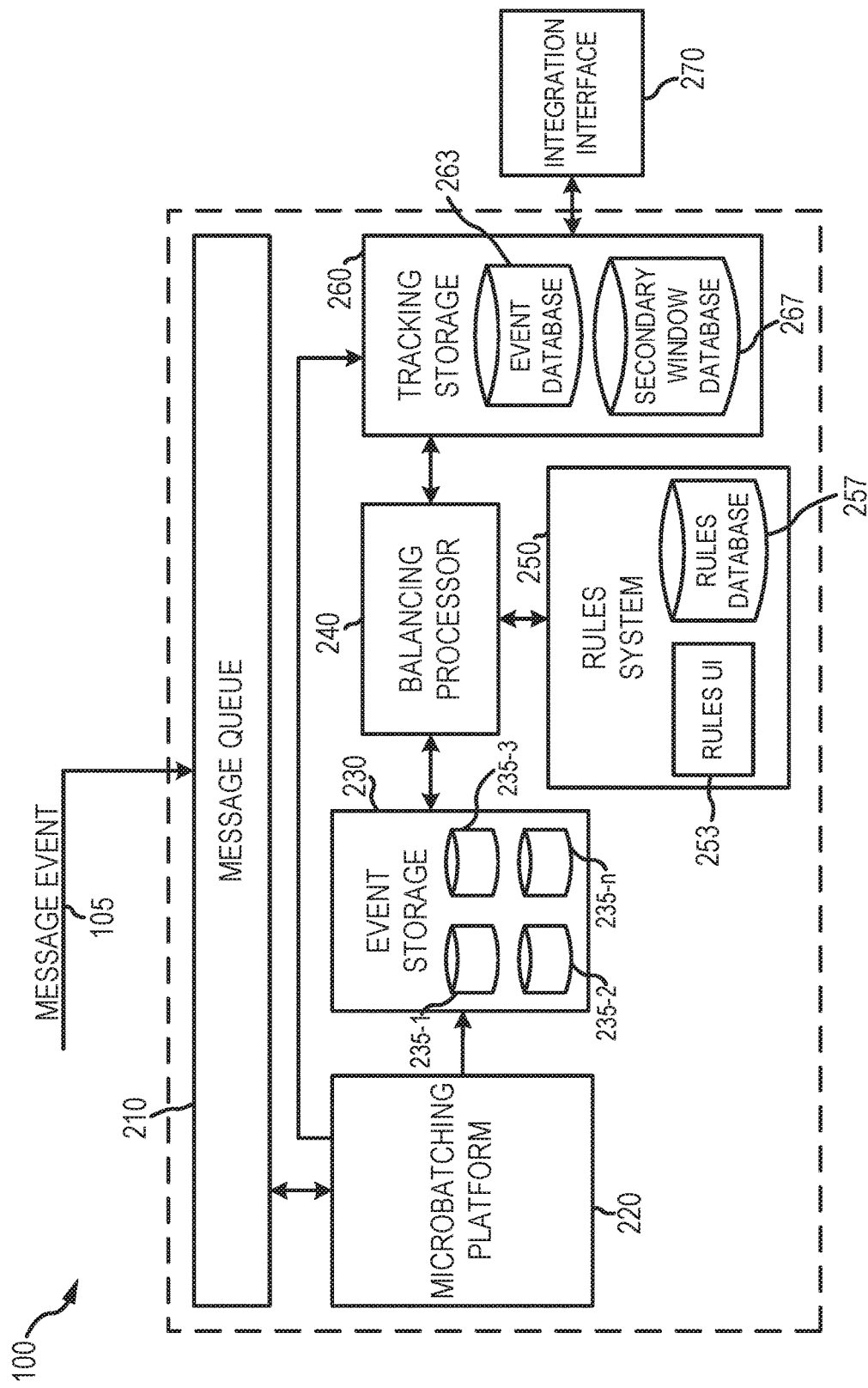
FIG. 2 illustrates an exemplary balancing and control framework for use in the system for balancing and control of messages, in accordance with various embodiments.

In various embodiments, and with reference to FIGS. 1 and 2, each processing system 25 may be configured to generate one or more message events 105 based on processing of the message 15. For example, each processing system 25 may generate a message event 105 in response to receiving the message 15, completing processing of the message 15, transmitting the message 15, and/or based on any other defined event. Message event 105 may comprise data regarding the message 15, the processing system 25 generating the message event 105, and/or the like. For example, message event 105 may comprise a message event identifier (e.g., name, ID, etc.), the message timestamp, the message flow type, a processing system identifier (e.g., name, ID, etc.) of the current processing system 25, a processing system identifier of the next processing system 25 in the message flow, the message identifier (e.g., name, ID, etc.), and/or the like. In that regard, message event 105 may comprise a smaller data packet size than the message 15 that the message event 105 is based on.

In various embodiments, the smaller data packet size of the message event 105 may enable system 10 to process and validate messages, and complete balancing and control operations, faster and more efficiently than typical systems processing the entire message. In various embodiments, message event 105 may be formatted as a JSON payload. Processing system 25 may transmit the message event 105 to balancing and control framework 100, as discussed further herein. For example, each processing system 25, and/or message processing framework 20, may comprise an event publisher module configured to serialize message events into a JSON format before publishing the message event to balancing and control framework 100 (e.g., into message queue 210, with brief reference to FIG. 1).

In various embodiments, and with reference again to FIG. 1, balancing and control framework 100 may be configured to receive message events 105 from one or more processing systems 25 and perform various balancing and control operations, as discussed further herein. Balancing and control framework 100 may be in electronic communication with one or more processing systems 25 in message processing framework 20. Balancing and control framework 100 may comprise one or more hardware, software, and/or database components. For example, balancing and control framework 100 may comprise one or more network environments, servers, computer-based systems, processors, databases, and/or the like. Balancing and control framework 100 may comprise at least one computing device in the form of a computer or processor, or a set of computers/processors, although other types of computing units or systems may be used such as, for example, a server, web server, pooled servers, or the like. In various embodiments, balancing and control framework 100 may also include software, such as services, APIs, and the like, configured to perform various operations discussed herein.

In various embodiments, balancing and control framework 100 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. Exemplary processors may include any logic device capable of performing the logical operations disclosed herein, such as, for example, a central processing unit (CPU), an accelerated processing unit (APU), a digital signal processor (DSP), a field programmable gate array (FPGA), an application specific integrated circuit (ASIC), or the like.

Balancing and control framework 100 may comprise one or more software, hardware, and/or database components configured to perform various balancing and control operations. For example, in accordance with various embodiments and with reference again to FIG. 2, balancing and control framework 100 may comprise a message queue 210, a microbatching platform 220, an event storage 230, a balancing processor 240, a rules system 250, and/or a tracking storage 260. In various embodiments, event storage 230, tracking storage 260, and/or rules database 257 may comprise logical partitions of one or more databases. In various embodiments, event storage 230, tracking storage 260, and/or rules database 257 may comprise separate databases.

Message queue 210 may be in electronic communication with microbatching platform 220. Message queue 210 may be configured to receive the message events 105 from one or more processing systems (e.g., processing systems 25, with brief reference to FIG. 1). Message queue 210 may comprise any suitable hardware, software, and/or database components configured to receive and store message events 105. For example, message queue 210 may comprise a stream-processing platform, such as the distributed streaming platform provided by APACHE® KAFKA®.

Microbatching platform 220 may be in electronic communication with message queue 210, event storage 230, and/or tracking storage 260. Microbatching platform 220 may be configured to retrieve the message event 105 from message queue 210. In various embodiments, microbatching platform 220 may be configured to retrieve all message events 105 stored in message queue 210 based on a microbatch time period (e.g., one minute, five minutes, one hour, etc.). Microbatching platform 220 may be configured to determine the timestamp of each message event 105, and publish the message event 105 to an associated time window 235 based on the timestamp, as discussed further herein.

In various embodiments, microbatching platform 220 may be configured to parse the message event 105 and transmit message data (or metadata) associated with the message event 105 to time window 235. For example, wherein the message event 105 comprises financial transaction data submitted by a merchant, the message data may comprise data corresponding to calculated transaction amounts, such as, for example, a gross transaction amount, a discount amount, a net transaction amount, and/or the like. Microbatching platform 220 may also be configured to transmit each message event 105 to event database 263 in tracking storage 260. Microbatching platform 220 may comprise any suitable hardware, software, and/or database components configured to retrieve the message events 105 from message queue 210 and/or transmit the message events 105 to one or more components of balancing and control framework 100. For example, microbatching platform 220 may comprise a software service capable of streaming data, such as the streaming service provided by APACHE® SPARK™.

Event storage 230 may be in electronic communication with microbatching platform 220 and/or balancing processor 240. Event storage 230 may comprise one or more time windows 235. For example, event storage 230 may comprise a first time window 235-1, a second time window 235-2, a third time window 235-3, an "Nth" time window 235-n, and/or any other suitable or desired number of time windows 235. In various embodiments, each time window 235 may be associated to a time period in a given day. For example, first time window 235-1 may be assigned to a time period of 9:00 AM to 9:15 AM, second time window 235-2 may be assigned to a time period of 9:16 AM to 9:30 AM, third time window 235-3 may be assigned to a time period of 9:31 AM to 9:45 AM, Nth time window 235-n may be assigned to a time period of 9:46 AM to 10:00 AM, etc. Each time period may comprise any desired length, and the total number of time windows 235 in event storage 230 may be based on the time period (e.g., wherein each time window 235 comprises a time period of one hour, event storage 230 may comprise twenty-four time windows 235 for each hour in the day). Each time window 235 may be configured to store message events 105 having a timestamp within the time period, as discussed further herein. Event storage 230 may comprise one or more hardware, software, and/or database components capable of storing data.

For example, with reference to FIG. 4, and in accordance with various embodiments, an exemplary time window 435 is disclosed. The exemplary time window 435 is depicted assigned to a time period of 9:00 AM to 9:15 AM. Each message event stored in the time window 435 (depicted horizontally in the table) may comprise data such as, for example, the processing system, the message identifier, the message timestamp, the message event identifier, various message data (e.g., message data 1, message data 2, etc.), and/or any other suitable or desired data points. The message events may be stored in any suitable format and in suitable order in the time window 435. For example, the message events may be sorted by message ID, message event ID, or the like. In various embodiments, the message events may also be sorted by timestamp.

With reference again to FIG. 2, balancing processor 240 may be in electronic communication with event storage 230, rules system 250, and/or tracking storage 260. Balancing processor 240 may be configured to perform various balancing operations on the message events 105, as discussed further herein. For example, balancing processor 240 may retrieve message events 105 (and/or message data, such as, for example, transaction totals) aggregated in a given time window 235, and may perform an aggregated balancing operation and/or an event balancing operation to determine whether the message events 105 are in-balance or out-of-balance. The aggregated balancing operation and/or the event balancing operation may be based on rules provided by rules system 250. Balancing processor 240 may comprise any suitable hardware, software, and/or database components capable of performing balancing operations discussed further herein.

Rules system 250 may be in electronic communication with balancing processor 240. Rules system 250 may be configured to provide balancing rules and operations to balancing processor 240, as discussed further herein. Rules system 250 may comprise any suitable hardware, software, and/or database components capable of storing and providing the balancing rules. Rules system 250 may comprise a rules user interface (UI) 253 and a rules database 257. Rules UI 253 may comprise software, a mobile application, a web interface, or the like accessible from a user device. For example, rules UI 253 may include a graphical user interface ("GUI"), software modules, logic engines, various databases, interfaces to systems and tools, and/or computer networks. Rules UI 253 may be configured to enable a user to access rules system 250 and update preexisting rules stored in rules database 257 and/or create new rules to control balancing operations executed by balancing processor 240. Rules database 257 may be configured to store and maintain the rules governing balancing operations in balancing and control framework 100. Rules database 257 may comprise any suitable hardware, software, and/or database components capable of storing and maintaining data. For example, rules database 257 may store and maintain a balancing schedule, aggregated balancing rules, event balancing rules, and/or the like, as discussed further herein.

Tracking storage 260 may be in electronic communication with microbatching platform 220, balancing processor 240, and/or an integration interface 270. Tracking storage 260 may comprise any suitable hardware, software, and/or database components capable of storing and maintaining data. Tracking storage 260 may comprise an event database 263 and/or a secondary window database 267. Event database 263 may be configured to store message events 105. For example, event database 263 may receive message events 105 from microbatching platform 220 in response to microbatching platform 220 retrieving the message event 105 from message queue 210. In that regard, event database 263 may comprise a secondary copy of each message event 105. As discussed further herein, the secondary copy may be used to determine the processing system 25 creating an out-of-balance event.

Secondary window database 267 may be configured to store messages 15 that are configured to be processed multiple times by message processing framework 20. For example, in response to message 15 completing a first processing in message processing framework 20, the message 15 may be stored in secondary window database 267. Message 15 may then be retrieved from secondary window database 267 and processed a second time in message processing framework 20. For example, wherein the message 15 comprises financial transaction data submitted by a merchant, a first processing may be completed to calculate transaction amounts, such as, for example, a gross transaction amount, a discount amount, a net transaction amount, or the like. Based on a payment agreement with the merchant (e.g., remit payment the 15th of every month, etc.) all messages 15 from the merchant may be processed a second time to remit payment to the merchant.

Integration interface 270 may be in electronic communication with balancing and control framework 100 (e.g., via balancing processor 240 and/or tracking storage 260). Integration interface 270 may comprise software, a mobile application, a web interface, or the like accessible from a user device. For example, integration interface 270 may include a graphical user interface ("GUI"), software modules, logic engines, various databases, interfaces to systems and tools, and/or computer networks. Integration interface 270 may be configured to enable a user to interact with balancing and control framework 100, such as, for example, by receiving out-of-balance alerts generated in response to a processed message being out-of-balance, as discussed further herein.

Figure 3:
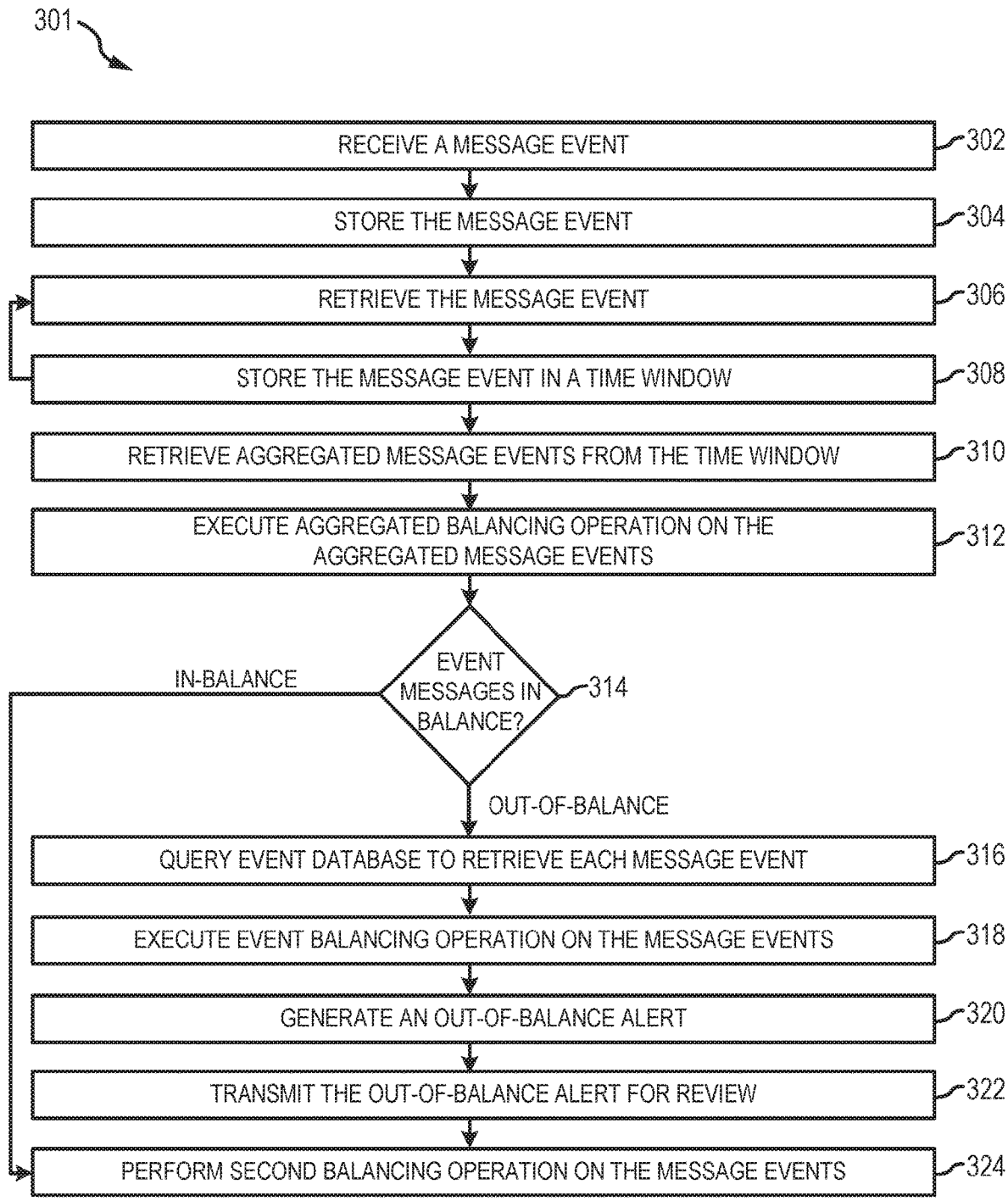
FIG. 3 illustrates a process flow for a method of messaging balancing and control, in accordance with various embodiments.

Referring now to FIG. 3 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and elements depicted in FIG. 3, but also to the various system components as described above with reference to FIGS. 1 and 2. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With specific reference to FIG. 3, and in accordance with various embodiments, a process 301 for messaging balancing and control is disclosed. Process 301 may include receiving a message event 105 (step 302) and storing the message event (step 304) in message queue 210. Message queue 210 may receive the message event 105 from one or more processing systems 25.

For example, message processing framework 20 may receive a message 15 and may timestamp the message 15 based on the current time that the message 15 was received.

Message processing framework 20 may transmit the message 15 to a first processing system 25-1 for processing of the message 15. In response to receiving the message 15, first processing system 25-1 may generate the message event 105, and publish the message event 105 to message queue 210.

Process 301 may include retrieving the message event 105 (step 306) from message queue 210. Microbatching platform 220 may be configured to retrieve the message event 105 from message queue 210. In various embodiments, microbatching platform 220 may be configured to retrieve all message events 105 stored in message queue 210 based on a microbatch time period (e.g., every five minutes, one hour, etc.).

Process 301 may include storing the message event 105 in a time window 235 (step 308) in event storage 230. For example, in response to retrieving the message event 105, microbatching platform 220 may parse the message event 105 to determine the message timestamp. In various embodiments, wherein the message event 105 comprises a JSON format, microbatching platform 220 may deserialize the JSON message to determine the message timestamp. In response to determining the message timestamp, microbatching platform 220 may transmit the message event 105 for storage in a time window 235 based on the message timestamp (e.g., as depicted in exemplary time window 435, with brief reference to FIG. 4). For example, wherein the message timestamp comprises a time of 9:18 AM, microbatching platform 220 may store the message event 105 in a second time window 235-2 assigned to a time period of 9:15 AM to 9:30 AM. In various embodiments, microbatching platform 220 may also be configured to transmit the message event 105 to event database 263 in tracking storage 260, in response to retrieving the message event 105 from message queue 210.

In various embodiments, microbatching platform 220 may continue to retrieve and store message events 105 in time windows 235 (based on the microbatch time period) such that each time window 235 comprises an aggregate of message events 105 that are associated with all messages 15 received in system 10 during the time period covered by the time window 235 (e.g., all messages 15 received in system 10 between 9:15 AM and 9:30 AM are stored in the time window 235 assigned to the time period of 9:15 AM to 9:30 AM).

Process 301 may include retrieving the aggregated message events 105 from the time window 235 (step 310). For example, balancing processor 240 may be configured to retrieve all aggregated message events 105 from a time window 235 based on a balancing schedule. The balancing schedule may be stored in rules database 257 and retrieved by balancing processor 240. The balancing schedule may define rules instructing balancing processor 240 to retrieve message events 105 from a time window 235 at a defined time after the time period covered by that time window 235. For example, the balancing schedule may be generic to all time windows 235 (e.g., 15 minutes after the end of the time period of a time window 235), or may be specific to one or more time windows 235 (e.g., process the first time window 235-1 at 9:45 AM, the second time window 235-2 at 10:15 AM, etc.).

In various embodiments, the balancing schedule may be based on processing times in message processing framework 20. For example, a historical analysis may be performed to calculate an average processing time in message processing framework 20 (e.g., the mathematical average, a range of average processing times, etc.). For example, the average processing time may be based on the message timestamp and a time at completion of processing in message processing framework 20. In that respect, the balancing schedule may be configured to comprise a time that all messages 15 having a timestamp occurring within a defined time window 235 should be completed processing by. In various embodiments, a grace period may be added to the calculated average processing time to ensure that all message events 105 are stored in the appropriate time window 235 prior to validating the message events 105.

In various embodiments, a user may access rules UI 253 to revise the balancing schedule for one or more time windows 235. In various embodiments, the balancing schedule may also be based on machine learning, artificial intelligence, or the like configured to revise the balancing schedule to account for processing delays in message processing framework 20. For example, in response to a time window 235 being consistently out-of-balance but receiving additional message events 105 after the validation, machine learning techniques may be applied to revise the balancing schedule to account for the late message events 105 being received. For example, in response to a machine learning analysis determining that additional message events 105 are consistently received within 20 minutes of the message 15 being received, but the balancing schedule is currently 15 minutes, the machine learning output may be used to adjust the balancing schedule to be 20 minutes instead of 15 minutes. In various embodiments, the machine learning may also be used to make the balancing schedule more efficient. For example, in response to a machine learning analysis determining that all message events 105 for a given message 15 are received within 10 minutes of the message 15 being received, but the balancing schedule is currently 15 minutes, the machine learning output may be used to adjust the balancing schedule to be 10 minutes, 12 minutes, or the like.

In response to retrieving the aggregated message events 105 from a time window 235, process 301 may include executing an aggregated balancing operation on the aggregated message events 105 (step 312). The aggregated balancing operation may be configured to balance the aggregated message events 105 at a high level, as discussed further herein. Balancing processor 240 may be configured to execute the aggregated balancing operation based on one or more aggregated balancing rules. Balancing processor 240 may retrieve the aggregated balancing rules from rules database 257. The aggregated balancing rules may define the steps in the aggregated balancing operation.

In various embodiments, the aggregated balancing operation may comprise comparing the message data from message events 105 having the same message identifier and message event identifier. For example, balancing processor 240 may compare the message data to determine whether the message data from each processing system 25-1 balances.

As an exemplary example, and with reference again to FIG. 4, balancing processor 240 may balance each message event having a message event identifier of IMC_PREPAYMENT. For example, balancing processor 240 may compare the message data 1 from all message events from system 25-1 (e.g., one message event having a timestamp of 9:03:02) to the message data 1 from all message events from system 25-2 (e.g., two message events having a timestamp of 9:03:02), and may compare the message data 2 from all message events from system 25-1 to the message data 2 from all message events from system 25-2. In response to the SUBMISSION_AMT and TOTAL_AMT of the message events from each system 25 being equal, the processing may be in balance (e.g., as depicted in FIG. 4). As a further example, balancing processor 240 may comprise the message data 1 from all message events from system 25-1 (e.g., one message event having a timestamp of 9:07:18) to the message data 1 from all message events from system 25-3 (e.g., one message event having a timestamp of 9:07:18). In response to the SALESRECEIVED_AMT and the SALESSENT_AMT of the messages events from each system 25 being equal, the processing may be in balance (e.g., as depicted in FIG. 4).

As a further example, and in accordance with various embodiments, wherein the message 15 corresponds to a financial transaction, balancing processor 240 may compare the message events 105 to determine whether the financial calculations are accurate (e.g., a gross amount should be equal to a discount amount and a net amount, a loyalty point distribution should be equal to a gross amount multiplied by a loyalty point multiplier, etc.). In various embodiments, balancing processor 240 may compare the financial calculations based on the message data transmitted by microbatching platform 220.

In response to the aggregated balancing operation determining that the aggregated message events 105 are out-of-balance (step 314), process 301 may include querying event database 263 to retrieve each message event 105 (step 316) based on the out-of-balance determination. For example, wherein the out-of-balance determination was made based on all message events 105 from the aggregated message events, balancing processor 240 may retrieve all message events 105 from event database 263 (e.g., based on a message identifier, message timestamp, etc.). As a further example, wherein the out-of-balance determination was made based on message events 105 from a particular message event type, balancing processor 240 may retrieve only those message events 105 from event database 263 (e.g., based on a message identifier, message timestamp, etc.).

In response to retrieving the applicable message events 105, process 301 may include executing an event balancing operation on the message events 105 (step 318). The event balancing operation may be configured to balance the message events 105 at an individual level, as discussed further herein. Balancing processor 240 may be configured to execute the event balancing operation based on one or more event balancing rules. Balancing processor 240 may retrieve the event balancing rules from rules database 257. The event balancing rules may define the steps in the event balancing operation.

For example, event balancing rules may control balancing processor 240 to compare each message event 105 for a particular message 15 to determine the missing message event 105 (e.g., compare the message events 105 one by one to determine the processing system 25 that caused the out-of-balance event). As a further example, based on the message flow type of the message 15, balancing processor 240 may determine whether each processing system 25 generated a message event 105 in response to receiving the message 15 and/or in response to completing processing of the message 15. By determining the processing system 25 that did not generate a message event 105, balancing processor 240 may determine the processing system 25 that caused the out-of-balance event.

Process 301 may include generating an out-of-balance alert (step 320). Balancing processor 240 may generate the out-of-balance alert to comprise data regarding the determined out-of-balance event, such as, for example, data about the message (e.g., the message identifier, the message flow type, the message data, the message version, etc.), data about the processing system (e.g., the processing system identifier), out-of-balance details (e.g., the date/time the event was detected), and/or the like. Process 301 may include transmitting the out-of-balance alert for review (step 322). For example, balancing processor 240 may transmit the out-of-balance alert to integration interface 270 for manual review and/or remediation of the out-of-balance event.

In various embodiments, in response to the aggregated balancing operation (e.g., step 312) determining that the aggregated message events are in-balance (step 314), or as a result of transmitting the out-of-balance alert for review (step 322), process 301 may include performing a second balancing operation on the message events (step 324). For example, balancing processor 240 may be configured to retrieve the aggregated message events 105 from the time window 235 and perform a second aggregated balancing operation (e.g., steps 310 and 312) based on a second balancing schedule from rules database 257. The second balancing schedule may be different from the first balancing schedule, and may be configured to ensure that additional message events 105 were not received in a time window 235.

In various embodiments, a message 15 may also need to be processed multiple times in message processing framework 20. For example, in response to message 15 completing a first processing in message processing framework 20, the message 15 may be stored in secondary window database 267. Message 15 may then be retrieved from secondary window database 267 (e.g., by microbatching platform 220) and processed a second time in message processing framework 20. In that respect, message 15 and the generated message events 105 may be balanced after each processing in message processing framework 20. For example, wherein the message 15 comprises financial transaction data submitted by a merchant, a first processing may be completed to calculate transaction amounts, such as, for example, a gross transaction amount, a discount amount, a net transaction amount, or the like. Based on a payment agreement with the merchant (e.g., remit payment the 15th of every month, etc.) all messages 15 from the merchant may be processed a second time to remit payment to the merchant.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "transmit" may include sending at least a portion of electronic data from one system component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of the system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system. For example, and in accordance with various embodiments, the components of system 10 may be in direct electronic communication with each other via a bus, network, and/or the like.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "eBook," an "eMagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS' applications but have been combined for simplicity.

In various embodiments, components, modules, and/or engines of system 10, or one or more subcomponents of system 10, may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In various embodiments, one or more servers discussed herein may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled System and Method for Transaction Account Based Micro-Payments and filed on Jul. 31, 2018, U.S. application Ser. No. 16/052,416 titled PROCUREMENT SYSTEM USING BLOCKCHAIN and filed on Aug. 1, 2018, U.S. application Ser. No. 16/054,185 titled BLOCKCHAIN-ENABLED DATASETS SHARED ACROSS DIFFERENT DATABASE SYSTEMS and filed on Aug. 3, 2018, U.S. application Ser. No. 16/168,477 titled MULTI-MERCHANT LOYALTY POINT PARTNERSHIP and filed on Oct. 23, 2018, U.S. application Ser. No. 16/217,654 titled PEER-TO-PEER CONFIDENTIAL DOCUMENT EXCHANGE and filed on Dec. 12, 2018, U.S. application Ser. No. 16/217,734 titled ZERO-KNOWLEDGE PROOF PAYMENTS USING BLOCKCHAIN and filed on Dec. 12, 2018, U.S. application Ser. No. 16/220,235 titled TRANSACTION ACCOUNT DATA MAINTENANCE USING BLOCKCHAIN and filed on Dec. 14, 2018, and U.S. application Ser. No. 16/239,017 titled HYBRID IDENTITY AS A SERVICE FOR DECENTRALIZED BROWSER BASED WALLER and filed on Jan. 3, 2019, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption of data in system 10, including in one or more databases, may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multi-threaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
  retrieving, by a processor, a plurality of aggregated message events from a first time window based on a balancing schedule, wherein each message event of the plurality of aggregated message events comprises a timestamp representative of a point in time that a particular message was received, and wherein the timestamp is within a time period assigned to the first time window;
  executing, by the processor, an aggregated balancing operation on the plurality of aggregated message events based at least in part on comparing a first message data of a first message event to a second message data of a second message event, wherein the first message event has a first timestamp that corresponds to a second timestamp of the second message event; and
  executing, by the processor, an event balancing operation on the plurality of aggregated message events in response to determining in the aggregated balancing operation that the plurality of aggregated message events are out-of-balance.

2. The method of claim 1, wherein each message event comprises metadata associated with a message, and wherein each message event is generated by a processing system configured to process the message.

3. The method of claim 2, wherein the executing the aggregated balancing operation comprises comparing message data from the message events for each processing system.

4. The method of claim 2, wherein the executing the event balancing operation comprises comparing each message event from the plurality of aggregated message events to determine the processing system causing the out-of-balance.

5. The method of claim 2, wherein the processing system generates each message event in response to receiving the message or completing processing of the message.

6. The method of claim 2, further comprising:
receiving, by the processor, the first message event from the processing system;
storing, by the processor, the first message event in a message queue;
retrieving, by the processor, the first message event from the message queue, wherein the first message event is retrieved based on a microbatch time period that is associated with a microbatching platform; and
storing, by the processor, the first message event in the first time window, wherein the first time window is selected to store the first message event based on the first timestamp.

7. The method of claim 1, further comprising generating, by the processor, an out-of-balance alert in response to determining that the plurality of aggregated message events are out-of-balance.

8. The method of claim 1, further comprising:
retrieving, by the processor, a plurality of second aggregated message events from a second time window based on the balancing schedule, wherein each message event in the plurality of second aggregated message events comprises a third timestamp, wherein the third timestamp is within a second time period assigned to the second time window, and wherein the second time period is different from the time period assigned to the first time window; and
executing, by the processor, the aggregated balancing operation on the plurality of second aggregated message events.

9. A system comprising:
a computing device that includes a processor;
a memory configured to communicate with the processor; and
machine-readable instructions stored in the memory that, when executed by the processor, cause the computing device to at least:
retrieve a plurality of aggregated message events from a first time window based on a balancing schedule, wherein each message event in the plurality of aggregated message events comprises a timestamp representative of a point in time that a particular message was received, and wherein the timestamp is within a time period assigned to the first time window;
execute an aggregated balancing operation on the plurality of aggregated message events based at least in part on comparing a first message data of a first message event to a second message data of a second message event, wherein the first message event has a first timestamp that corresponds to a second timestamp of the second message event; and
execute an event balancing operation on the plurality of aggregated message events in response to determining in the aggregated balancing operation that the plurality of aggregated message events are out-of-balance.

10. The system of claim 9, wherein each message event comprises metadata associated with a message, and wherein each message event is generated by a processing system configured to process the message.

11. The system of claim 10, wherein the executing the aggregated balancing operation comprises comparing message data from the message events for each processing system.

12. The system of claim 10, wherein the executing the event balancing operation comprises comparing each message event from the plurality of aggregated message events to determine the processing system causing the out-of-balance.

13. The system of claim 10, wherein the processing system generates each message event in response to receiving the message or completing processing of the message.

14. The system of claim 10, wherein the machine-readable instructions, when executed by the processor, cause the computing device to at least:
a receive the first message event from the processing system;
store the first message event in a message queue;
retrieve the first message event from the message queue, wherein the first message event is retrieved based on a microbatch time period that is associated with a microbatching platform; and
store the first message event in the first time window, wherein the first time window is selected to store the first message event based on the first timestamp.

15. The system of claim 9, wherein the machine-readable instructions, when executed by the processor, cause the computing device to at least generate an out-of-balance alert in response to determining that the plurality of aggregated message events are out-of-balance.

16. A non-transitory computer readable medium having machine-readable instructions executable by a processor of a computing device, wherein the machine-readable instructions, when executed computing device, cause computing device to at least comprising:
retrieve a plurality of first aggregated message events from a first time window based on a balancing schedule, wherein each message event in the plurality of aggregated message events comprises a timestamp representative of a point in time that a particular message was received, and wherein the timestamp is within a first time period assigned to the first time window;
execute an aggregated balancing operation on the plurality of aggregated message events based at least in part on comparing a first message data of a first message event to a second message data of a second message event, wherein the first message event has a first timestamp that corresponds to a second timestamp of the second message event; and
execute the aggregated balancing operation on the plurality of aggregated message events in response to determining in the aggregated balancing operation that the plurality of aggregated message events are out-of-balance.

17. The non-transitory computer readable medium of claim 16, wherein the machine-readable instructions, when executed by the processor, further cause the computing device to at least determine that the plurality of aggregated message events are out-of-balance based at least in part on an indication from the comparison that the first message data of the first message event fails to match the second message data of the second message event.

18. The non-transitory computer readable medium of claim 16, wherein the machine-readable instructions, when executed by the processor, further cause the computing device to at least generate an out-of-balance alert in response to determining that the plurality of aggregated message events are out-of-balance.

19. The non-transitory computer readable medium of claim 16, wherein each message event comprises metadata associated with a message, and wherein each message event is generated by a processing system configured to process the message.

20. The non-transitory computer readable medium of claim 19, wherein the executing the aggregated balancing operation comprises comparing message data from the message events for each processing system.

\* \* \* \* \*